(12) United States Patent
Di Bona et al.

(10) Patent No.: US 12,136,283 B2
(45) Date of Patent: Nov. 5, 2024

(54) SYSTEMS, DEVICES AND METHODS FOR IDENTIFYING, COLLECTING, RELOCATING, AND ANALYZING MICROMETER- AND NANOMETER-SCALE PARTICLES

(71) Applicant: WYONICS LLC, Laramie, WY (US)

(72) Inventors: Kristin R. Di Bona, Laramie, WY (US); Caleb M. Hill, Laramie, WY (US)

(73) Assignee: WYONICS LLC, Laramie, WY (US)

( * ) Notice: Subject to any disclaimer, the term of this patent is extended or adjusted under 35 U.S.C. 154(b) by 0 days.

(21) Appl. No.: 18/559,769

(22) PCT Filed: Apr. 11, 2023

(86) PCT No.: PCT/US2023/018167
§ 371 (c)(1),
(2) Date: Nov. 8, 2023

(87) PCT Pub. No.: WO2023/200787
PCT Pub. Date: Oct. 19, 2023

(65) Prior Publication Data
US 2024/0233413 A1      Jul. 11, 2024

Related U.S. Application Data

(60) Provisional application No. 63/330,168, filed on Apr. 12, 2022.

(51) Int. Cl.
*G06V 20/69* (2022.01)
*G01N 15/1433* (2024.01)
*G06T 7/70* (2017.01)

(52) U.S. Cl.
CPC ....... *G06V 20/693* (2022.01); *G01N 15/1433* (2024.01); *G06T 7/70* (2017.01); *G06T 2207/10056* (2013.01)

(58) Field of Classification Search
CPC .......................................... G06T 2207/10056
(Continued)

(56) References Cited

U.S. PATENT DOCUMENTS

| 2012/0273692 A1* | 11/2012 | Tokuda | ...................... H04L 9/40 250/400 |
| 2013/0090778 A1* | 4/2013 | Brill | ....................... G01N 1/286 700/302 |

(Continued)

FOREIGN PATENT DOCUMENTS

| CN | 113373104 A | * | 9/2021 |
| JP | 2018180635 A | | 11/2018 |

(Continued)

*Primary Examiner* — Carlos R Rodriguez
*Assistant Examiner* — Joshua T Sanders
(74) *Attorney, Agent, or Firm* — HOLZER PATEL DRENNAN

(57) ABSTRACT

Systems and methods of manipulating nano- and micrometer scale particles are described. The system generally includes an optical imaging system for acquiring an image of a sample of particles, a processor for analyzing the image, identifying a target particle in the image, and determining the lateral position of the target particle in the sample of particles; and a vacuum-based probe system including a moveable probe and a vacuum pump configured to apply a vacuum up through the probe. The processor provides instructions for moving the probe to the lateral position of the target particle, and instructions to apply a vacuum up through the probe such that the target particle is pulled away from the sample of particles and held against the tip of the moveable probe. Once the probe collects and holds a target particle against the tip thereof, the probe can be moved to relocated the target particle to a precise new location, such as on to a particle retrieval tray.

17 Claims, 6 Drawing Sheets

(58) Field of Classification Search
USPC .......................................................... 700/302
See application file for complete search history.

(56) References Cited

U.S. PATENT DOCUMENTS

| | | | |
|---|---|---|---|
| 2013/0284593 A1* | 10/2013 | Shichi | H01J 37/3023 |
| | | | 204/298.03 |
| 2015/0198537 A1 | 7/2015 | Kimura et al. | |
| 2018/0119086 A1 | 5/2018 | Markussen et al. | |
| 2020/0066482 A1 | 2/2020 | Persoon et al. | |
| 2020/0141972 A1 | 5/2020 | Kornilov et al. | |
| 2020/0191794 A1* | 6/2020 | Cahill | G01N 30/7233 |
| 2021/0003496 A1 | 1/2021 | Handique et al. | |
| 2021/0225610 A1* | 7/2021 | Perea | H01J 37/02 |

FOREIGN PATENT DOCUMENTS

| | | | |
|---|---|---|---|
| JP | 2019097480 A | * | 6/2019 |
| WO | 2018094109 A1 | | 5/2018 |

* cited by examiner

SYSTEMS, DEVICES AND METHODS FOR IDENTIFYING, COLLECTING, RELOCATING, AND ANALYZING MICROMETER- AND NANOMETER-SCALE PARTICLES

CROSS-REFERENCE TO RELATED APPLICATIONS

This application claims the benefit of priority to U.S. Provisional Patent Application No. 63/330,168, filed Apr. 12, 2022, entitled "SYSTEMS, DEVICES AND METHODS FOR IDENTIFYING, COLLECTING, RELOCATING, AND ANALYZING MICROMETER- AND NANOMETER SCALE PARTICLES", the entirety of which is hereby incorporated by reference.

BACKGROUND

As microanalytical techniques advance and modern technologies continue to miniaturize, there exists a growing need for particle manipulation instrumentation with greater resolution and specific selectivity on a small micrometer (μm) to nanometer (nm) scale. The need for an instrumental platform which can spatially resolve μm-sized particles is apparent in microanalytical fields, such as nuclear forensics and semiconductors, which require the identification of micron-sized particles and non-destructive relocation to enable sequential analyses via several complementary analytical platforms. Advanced manufacturing industries, such as microelectronics, would also benefit from μm- to nm-scale particle manipulation and analysis technologies to generate advanced materials and remove contaminants.

Existing particle manipulation instrumentation suffers from various problems and shortcomings. For example, many existing particle manipulation systems have poor resolution and are therefore unable to precisely detect, collect, and/or manipulate particles at the nano- and micrometer scale. Existing particle manipulation systems also suffer from lack of accuracy and selectivity, making it difficult or impossible to locate and collect specific individual particles within a mixed sample. Particle contamination and/or damage is another problem faced by many existing systems. Relatively crude probes and/or collection techniques often lead to the particle surface being penetrated or chipped, and where impure materials are used for collection devices, this may lead to sample contamination. Further still, many existing systems require extensive training and/or experience to operate, are incompatible with other systems (e.g., other analytical tools), and/or have prohibitively long sample collection times (e.g., hours per particle).

Accordingly, a need exists for new and improved particle manipulation systems, devices and methods that solve some or all of the above-described problems.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some embodiments, a particle manipulation system is disclosed and described. The particle manipulation system generally includes an optical imaging system configured to acquire an image of a mixed sample of particles; a processor configured to analyze the image, identify a target particle in the image, and determine the lateral position of the target particle in the mixed sample of particles; and a vacuum-based probe system. The vacuum-based probe system includes a moveable probe; and a vacuum pump configured to apply a vacuum up through the probe. In operation, the processor may be further configured to instruct the vacuum-based probe system to move the moveable probe to the lateral position of the target particle; and initiate the vacuum pump to thereby apply a vacuum up through the probe such that the target particle is pulled away from the mixed sample of particles and held against the tip of the moveable probe. In some embodiments, the probe may then relocate the target particle to a different location, such as away and separate from the mixed sample of particles. In some embodiments, the particle manipulation system is adapted for use with nano- and micrometer scale particles.

In some embodiments, a method of manipulating nano- and micrometer scale particles is disclosed and described. The method generally includes the steps of: acquiring a magnified image of a mixed sample of particles, the mixed sample of particles comprising a plurality of particles having a size in the range of from about 0.01 to about 1,000 micrometers; analyzing the magnified image to identify a target particle; determining the lateral position of the target particle in the mixed sample of particles; moving a vacuum-based probe to the lateral position of the target particle; and applying a vacuum up through the vacuum-based probe to thereby pull the target away from the mixed sample of particles and hold the target particle against a tip of the probe. In some embodiments, the method further includes the steps of: moving the vacuum-based probe having the target particle held against the tip thereof to a lateral position over a particle retrieval tray; and terminating the vacuum such that the target particle releases from the tip of the vacuum-based probe and is deposited on to the particle retrieval tray.

These and other aspects of the technology described herein will be apparent after consideration of the Detailed Description and Figures herein. It is to be understood, however, that the scope of the claimed subject matter shall be determined by the claims as issued and not by whether given subject matter addresses any or all issues noted in the Background or includes any features or aspects recited in the Summary.

BRIEF DESCRIPTION OF THE DRAWINGS

Non-limiting and non-exhaustive embodiments of the disclosed technology, including the preferred embodiment, are described with reference to the following figures, wherein like reference numerals refer to like parts throughout the various views unless otherwise specified.

DETAILED DESCRIPTION

Embodiments are described more fully below with reference to the accompanying Figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Described herein are various embodiments of a particle manipulation system configured to identify, locate, collect, and relocate one or more particles within a sample of particles with a high degree of precision such that the system is capable of manipulating nano- and micrometer scale particles. The design of the system is also such that particles of the nano- and micrometer scale can be manipulated without damaging, destroying and/or contaminating the particles. The system may be designed with various components configured to identify one or more particles of interest within a sample of particles, determine a lateral location of the one or more particles of interest in the sample of particles, move a probe to the precise lateral location of one of the one or more particles of interest, apply and maintain a vacuum up through the probe to thereby pull the particle up from the sample and hold it against the tip of the probe, and then move the probe to relocate the particle. Various embodiments of an associated method for identifying and manipulating a target particle generally in accordance with the above description are also described herein. As used herein, the term particle can mean an individual particle, or a particle that is part of a cluster of two or more particles. As such, the particle manipulation systems and methods described herein can be used to identify, locate, collect, and relocate a single particle in a particle sample or a particle cluster in a particle sample.

Figure 1:
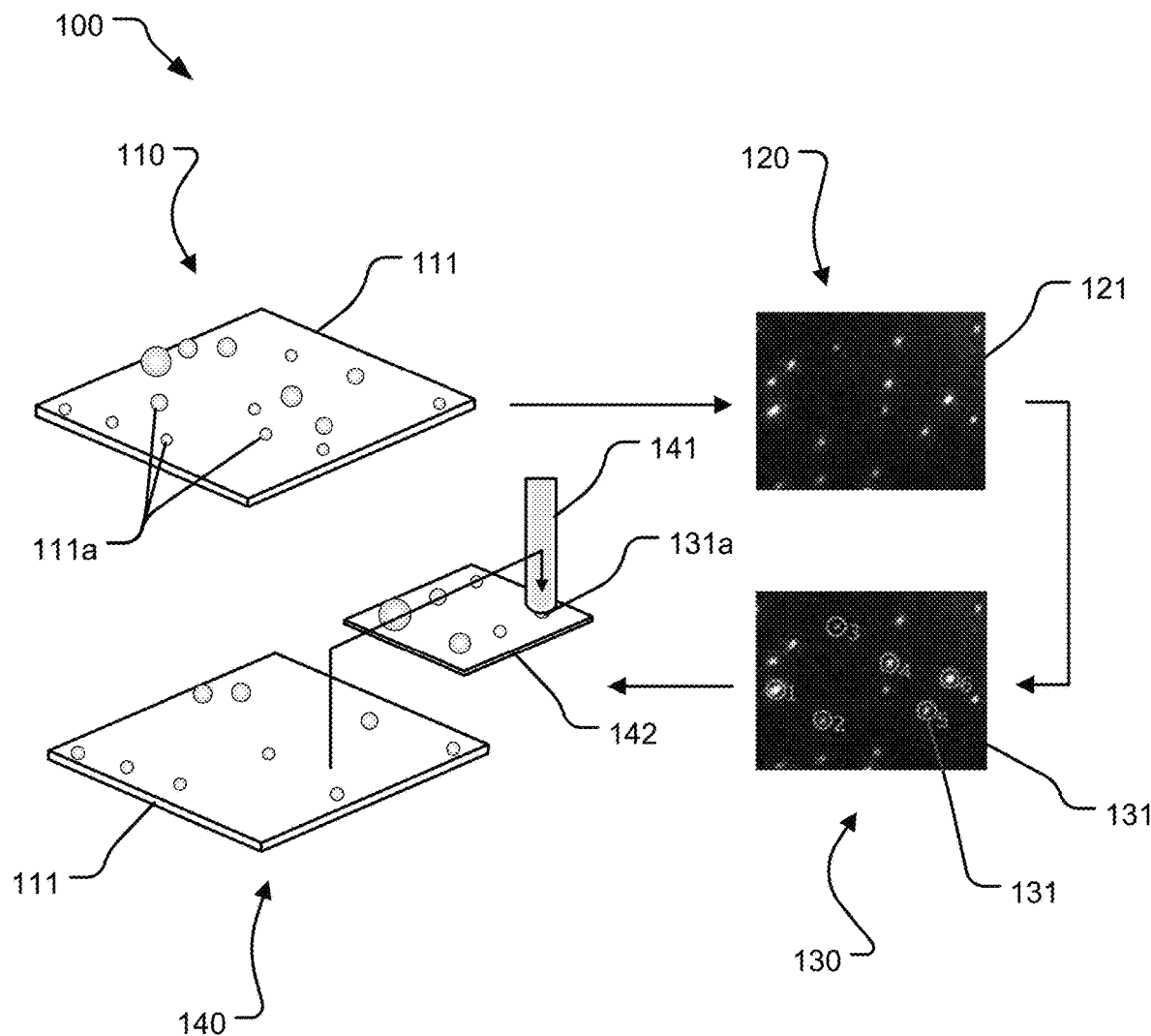
FIG. 1 is an illustration of a method for identifying, collecting and relocating particles in accordance with various embodiments described herein.

With reference to FIG. 1, an illustration is provided for the general method 100 of manipulating particles in accordance with various embodiments described herein. The method generally includes steps 110 through 140, with step 110 including providing a mixed sample of particles, step 120 including obtaining an image of the mixed sample of particles, step 130 including analyzing the image to, for example, identify the precise location of one or more particles in the mixed sample of particles, and step 140 including collecting a targeted particle from the mixed sample of particles (which may be part of a cluster of particles), and optionally repositioning the targeted particle.

At step 110, a mixed sample of particles 111 is provided. As used herein, the phrase "mixed sample of particles" is intended to convey that the particles included in the sample need not all be identical. For example, the mixed sample of particles may include particles of different size, shape, and/or material type. However, it should be appreciated that the systems and methods described herein could also be used on a sample wherein the particles are similar or identical in or more criteria, such as having relatively uniform shape and size, same material type, etc. The mixed sample of particles may also include any number of particles, including a single particle. In some embodiments, at least some of the particles included in the mixed sample of particles 111 have a size in the range of from 0.01 to 1,000 micrometers. The mixed sample of particles may also include particles having a size outside of this range, though such particles will generally not be target particles. Particles considered as having a size within the range of from 0.01 to 1,000 micrometers need exhibit only a single dimension within the stated size range. The dimension of the particle used to determine its size may include any dimension (e.g., length, width, thickness, diameter, etc.). The mixed sample or particles may also include isolated particles, clusters of particles, or a combination thereof.

The sample of particles provided in step 110 may be a dry sample of particles, or may include particles fully or partially immersed in a liquid. Dry samples generally include one or more particles disposed on a substrate with no (or no significant) amount of liquid included on the substrate such that the particles are not partially or fully immersed. Wet samples may include a substrate fully covered by a liquid and in which particles are partially or fully immersed, or a substrate on which a quantity of liquid is disposed on the substrate surface but which does not fully cover the substrate, and in which one or more particles are partially or fully immersed. Wet samples may therefore include some dry areas on the substrate surface and on which dry particles may reside.

As shown in FIG. 1, the mixed sample of particles 111 includes a plurality of particles 111a located in various locations. FIG. 1 shows the particles 111a all having a spherical shape but with various sizes, though it should be appreciated that the sample 111 may include a plurality of particles having a more uniform size and/or having different shapes. The particles shown in FIG. 1 may all be of the same material type, or may be made from different materials.

In step 120, an image 121 of the sample of particles 111 is obtained, such as through the use of an optical microscope. In some embodiments, dark field imaging may be used when acquiring the image 121 of sample of particle 111, though it should be appreciated that other imaging techniques can be used, provided that an image showing the location of most or all of the particles 111a in particle sample 111 is provided. In some embodiments, the image may also show the size and shape of the particles 111a.

In step 130, image analysis is carried out on the image 121 to provide an analyzed image 131. Any suitable image analysis technique can be used provided that the image analysis technique is capable of identifying within the image 121 one or more particles that meet one or more selected identification criteria. As shown in FIG. 1, the analyzed image 131 includes various particles 131a that have been identified as target particles based on the performed image analysis determining that these particles meet the selected identification criteria. As part of the image analysis step 130, the precise lateral location of each of the particles 131a is determined and/or recorded. As used herein, the term "lateral" means in a substantially horizontal plane and including both the x and y direction in the horizontal plane.

In step 140, a vacuum probe 141 is moved to the lateral position of a target particle 131a such that the probe 141 is positioned precisely over the target particle 131a. While the vacuum probe 141 and the target particle 131a are located in the same lateral position (i.e., x and y position), a separation distance in the z direction may exist between the tip of the vacuum probe 141 and the top of the target particle 131a. This separation distance in the z direction may be relatively small such that application of a vacuum up through the probe 141 causes the target particle 131a to be pulled up from the particle sample 111. The vacuum probe 141 may also be moveable in the z direction to adjust the separation distance between the tip of probe 141 and target particle 131a. Once the probe 141 is moved to the same lateral position as the target particle 131a (and optionally moved in a z direction to adjust the separation distance between the tip of probe 141 and the top of particle 131a), a vacuum is then applied up through the probe 141 such that the target particle 131a is pulled up from the sample 111 and held against the tip of the probe 141.

Once the particle 131a is secured to the probe 141 in this manner, the probe 141 may be moved to relocate the target particle 131a. In some embodiments, the probe 141 moves to a particle retrieval tray 142 that is separate from the sample 111. A lateral position (i.e., x and y coordinates) on the retrieval tray 142 may be selected, and once the probe 141 is moved to the new lateral position, the particle 131a is released from the probe 141, such as by terminating the vacuum flowing through the probe 141, thus resulting in the deposition of the particle 131a on the retrieval tray 142 at a precise location thereon. In some embodiments, the probe 141 may include a vent that can be opened when the particle 131a is to be released. Opening the vent in probe 141 eliminates the suction force applied by the vacuum without requiring the vacuum to be turned off. Other methods of releasing the particle from the probe tip can also be used, and are discussed in greater detail below. As discussed previously and in more detail below, vertical movement (i.e., in the z direction) of the probe 141 towards and away from the particles can also be incorporated into various parts of the method.

In an alternate embodiment, the probe 141 having particle 131a secured thereto remains substantially stationary after capture, and the retrieval tray 142 is moved under the probe 141 such that the captured particle 131a can be deposited on the retrieval tray 142. In such embodiments, the sample 111 may remain in place and the retrieval tray 142 can be moved to a position above the sample 111 but below the probe 141, or the sample 111 may be moved laterally and the retrieval tray 142 can be moved laterally into the space vacated by lateral movement of the sample 111. In either case, the lateral movement of the retrieval tray 142 is highly precise such that the retrieval tray 142 is positioned under the probe 141 such that the exact location on the retrieval tray 142 where the captured particle 131a is to be deposited is located under the probe 141.

The manner of depositing the target particle 131a on the retrieval tray 142 may be such that the position/orientation of the target particle 131a is not substantially changed from its position on the sample 111. For example, if the target particle 131a has a generally triangular shape in which corners of the triangle point south, northwest, and northeast, the particle 131a is picked up by the probe 141 in this position and is deposited in this same general orientation. In other embodiments, the orientation of the particle can be altered as part of the retrieval and repositioning systems and methods described herein. In one example, the probe 141 may be rotatable about its longitudinal axis such that the orientation of the particle can be adjusted 360 degrees.

As noted above, the ability of the location of the target particle to be precisely determined, the ability of the probe to be moved to the precise location, and the ability of the collected target particle to be moved to a precise location on a retrieval tray provide for a vastly improved and highly desirable micro- and nanometer scale particle manipulation system. In some embodiments, the precision of the movement of the probe, the sample tray, and/or the retrieval tray is aided by the type of system used to move the probe, sample tray, and/or retrieval tray. For example, selection of a stepper motor or piezo system may impact the precision with which different components of the system can be moved.

The spatial precision with which collected particles can be placed on, e.g., a particle retrieval tray, allows for the systems and methods described herein to be used for a variety of purposes. In some embodiments, once the particles are precisely placed on the retrieval tray, additional analyses of each individual particle can be carried out. The systems and methods also allow for the creation of precise patterns of relocated particles, which may be useful in, e.g., nanofabrication.

The above discussion of FIG. 1 provides a general description of and introduction to the systems and methods for particle manipulation disclosed herein. Additional details regarding both the system and the method are provided below.

Figure 2:
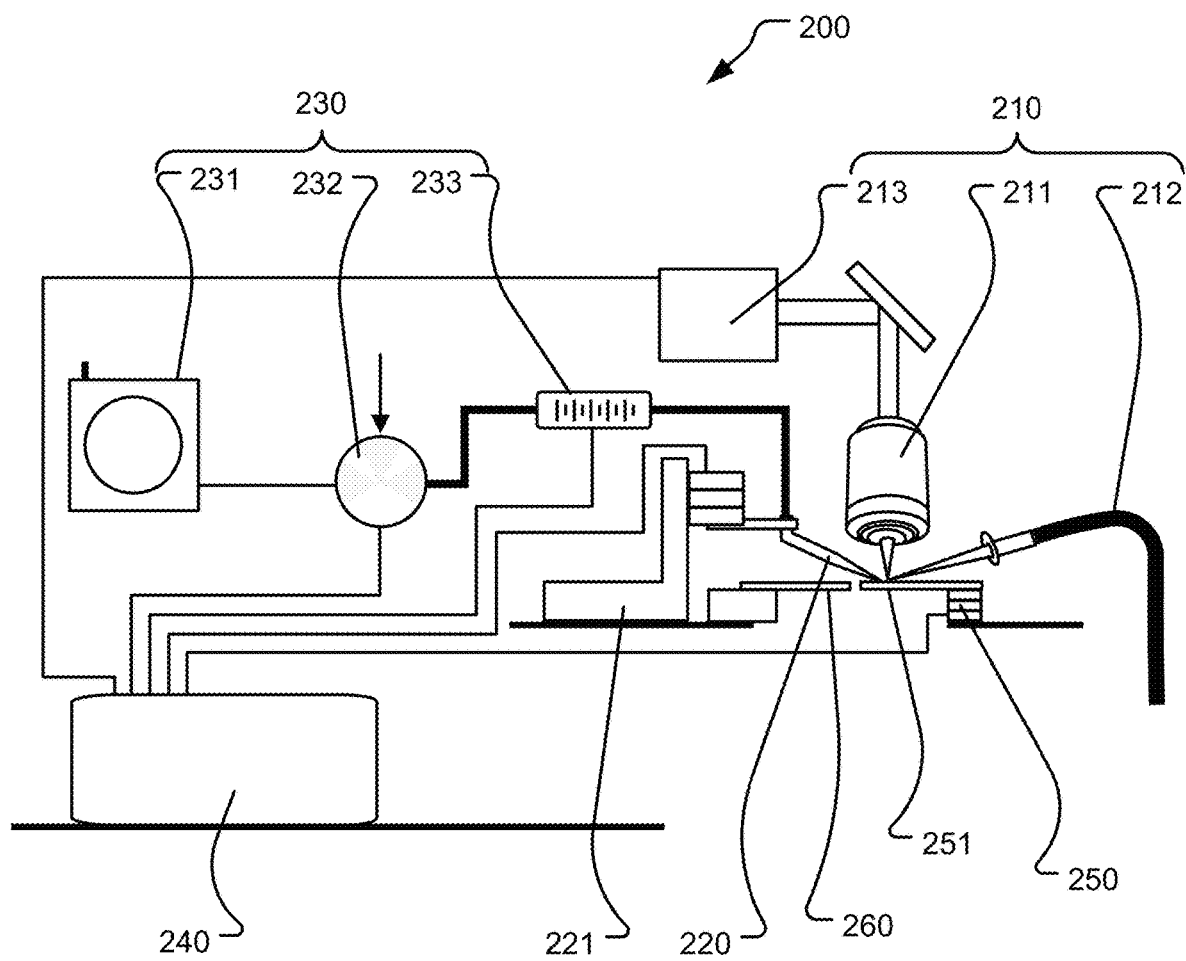
FIG. 2 is a schematic illustration of a system for identifying, collecting and relocating particles in accordance with various embodiments described herein.

With reference now to FIG. 2, a system 200 configured to carry out various embodiments of the method described in FIG. 1 is shown. The system 200 generally includes: optical imaging system 210 (including optical microscope 211, light source 212, and camera 213); a probe 220 (including a probe movement system 221); a vacuum system 230 (including vacuum pump 231, valve 232, and optionally flow meter 233); a processor 240; and a sample movement system 250 (upon which a particle sample 251 may be disposed).

With reference to optical imaging system 210, the optical imaging system 210 generally includes at least an optical microscope 211, a light source 212, and a camera 213. In some embodiments, and as shown generally in FIG. 2, the longitudinal axis of the optical microscope 211 is oriented substantially perpendicular to the plate or tray on which the sample of particles are disposed, while in other embodiments, the longitudinal axis of the optical microscope 211 may be arranged at an angle between 0 and 90 degrees relative to the plate or tray. The optical microscope 211 and the camera 213 are communicatively coupled such that the image acquired by the microscope 211 can be recorded by the camera 213. Any suitable type of microscope 211 can be used, though in some embodiments, the microscope 211 is specifically a microscope configured for acquiring high resolution images of nano- and micrometer scale particles. In one specific embodiment, the optical microscope includes a moderate numerical aperture, long-working distance (~1 cm) objective lens. By using a suitable long-working objective lens, this provides for sufficient space for both illumination of the sample 251 and introduction of the probe 220 onto the surface of the sample 251. The light source 212 may be any suitable light source capable of illuminating the sample 251, such as a broadband light source. In some embodiments, the light source 212 is capable of directing light at the sample 251 at a high angle of incidence. The light source 212 may also include an achromatic lens.

In some embodiments, the optical imaging system 210 is configured for dark field optical microscopy (also referred to as dark field imaging or dark field illumination). Dark field optical microscopy is well suited for particle imaging involving refractory materials. Generally speaking, the light source 212 having a high angle of incidence shines a light on the refractory materials, causing them to refract some of the light. The optical microscope 211 then captures this refracted light as a means for imaging the particles. While the optical imaging system 210 may be configured for dark field optical microscopy, the specific type of optical imaging carried out by optical imaging system 210 is not limited. Other optical imaging methods that may be performed by optical imaging system 210 include, but are not limited to, bright field, phase contrast, fluorescence, and Raman. Depending on the optical imaging method used, the particles can be refractory or non-refractory. In one non-limiting example, bright field optical imaging can be used when the sample includes non-refractory particles.

The optical imaging system 210 is communicatively coupled to the processor 240 such that the image of the mixed particle sample 251 obtained by the optical imaging system 210 and recorded by camera 213 can be transmitted to the processor 240 and processed and analyzed by the processor 240. In particular, the processor 240 is programmed to receive the optical image, analyze the optical image (either automatically or with user input) to identify target particles, and determine and/or record precise lateral positions (i.e., x and y coordinate) of the targeted particles. This information can then be used in conjunction with the probe 220 and probe movement system 221 to collect target particles as discussed in greater detail below. The processor 240 may be part of a computing device (not shown in FIG. 2), such as a CPU, and the computing device may further include or be communicatively and/or operably connected with, e.g., a display, a server, and/or hardware memory for storing software and computer instructions. The processor 240 may be, e.g., a microprocessor. The processor 240 can store and recall data and applications in the memory, including applications that process information and send commands/signals according to any of the methods disclosed herein. The processor 240 may also be configured to (i) display objects, applications, data, etc. on an interface/display and/or (ii) receive inputs through an interface/display. The processor 240 can also be coupled to a transceiver.

System 200 further includes probe 220 (and probe movement system 221) and vacuum pump system 230 (including vacuum pump 231, valve 232, and optionally flow meter 233). In some embodiments, the longitudinal axis of the probe 220 is oriented substantially perpendicular to the plate or tray on which the sample of particles are disposed, while in other embodiments (and as shown generally in FIG. 2) the longitudinal axis of the probe 220 may be arranged at an angle between 0 and 90 degrees relative to the plate or tray. The vacuum pump system 230 is in fluid communication with the probe 220 such that when the vacuum pump 231 is initiated and the valve 232 is opened, air is drawn into the tip of probe 220, and up and through the body of probe 220, providing the tip of probe 220 with a suction force capable of pulling a targeted particle up and away from sample 251 and holding the particle against the tip of the probe 220 for as long as the suction force is maintained. The vacuum pump 231, the valve 232, or both, are communicatively coupled to the processor 240 so that the processor can control operation of the vacuum pump (i.e., turn the vacuum pump on or off) and/or operation of the valve (i.e., open or close the valve).

The optional flow meter 233 generally monitors air flow therethrough to help determine when a particle has been pulled up against the tip of the probe 220. For example, when the flow meter 233 detects a significant drop in air flow, this is generally an indication that a particle is blocking the tip of the probe 220 and therefore the probe 220 has successfully collected the particle from the sample 251. By communicatively coupling the flow meter 233 to the processor 240, the processor 240 is thereby provided with information indicating that a target particle has been collected by the probe 220. This in turn can then be used to send further instructions to the probe 220, and more specifically, to the probe movement system 221 configured for moving the probe 220. For example, after the processor 240 has received information from the flow meter 233 indicating that a particle has been collected at the tip of the probe 220, the processor 240 can send instructions to probe movement system 221 instructing the probe movement system 221 to move probe 220 to a location over a target particle retrieval tray 260. The processor 240 can provide the probe movement system 221 with a precise lateral location on the target particle retrieval tray 260 so that the particle is precisely placed on the target particle retrieval tray 260.

While a flow meter 233 is described above as being used for determining when a particle has been captured by the probe, it should be appreciated that other means of determining target particle capture can also be used. For example, an optical sensor can be used to determine when a target particle is being held against the tip of the probe, either on its own or in conjunction with the flow meter previously discussed. Similarly, a pressure sensor can be used as part of determining when a target particle secured to the tip of the probe.

The system 200 further includes a sample movement system 250 on which the sample of particles 251 is disposed. The sample movement system 250 is capable of positioning the sample 251 under the microscope 211 so that an optical image of the sample 251 can be acquired. The specific type of movement system used for both the sample movement system 250 and the probe movement system 221 is not limited. As shown in FIG. 2, a three-axis piezo system is provided for both sample movement system 250 and probe movement system 221. Both movement systems 221, 250 are communicatively coupled to processor 240 such that the processor can send instructions to the systems 221, 250 for moving the sample 251 and/or probe 220.

While the system 200 has been described previously as using probe movement system 221 to move the probe 220 to a lateral location over a target particle disposed on stationary sample 251, it should be appreciated that when the system includes sample movement system 250, the system 200 and associated methods described herein can also be used by keeping the probe 220 stationary and moving the sample 251 via sample movement system 250 to thereby align a target particle under the stationary probe 220. In other words, the sample 251 can be moved in the x and y direction via sample movement system to position a target particle under stationary probe 220, at which point the probe 220 can be activated (e.g., vacuum initiated) to pull the target particle moved under the probe 220 up off the sample 251.

The processor 240 to which various components of the system 200 are communicatively coupled is generally any type of processor capable of receiving information and/or data, processing the information/data, and providing instructions to components of the system 200 (the instructions possibly being based on the information/date processed therein). In some embodiments, the processor 240 is or includes a central processing unit (CPU). In some embodiments, the processor 240 can include or be part of a personal computer (PC) or other similar device capable of carrying out the processor functions described previously. The processor 240 is programmable such that the functions described previously, as well as other functions not specifically described herein, can be carried out by the processor 240. This helps to make the overall system 200 highly customizable based on various instructions (via, e.g., software) that are loaded into the processor 240.

While not shown in FIG. 2, some or all of the system 200 can be constructed on a vibration-isolation table or pad in order to minimize the effects of vibration on the delicate micro or nanoscale manipulator.

Figure 3:
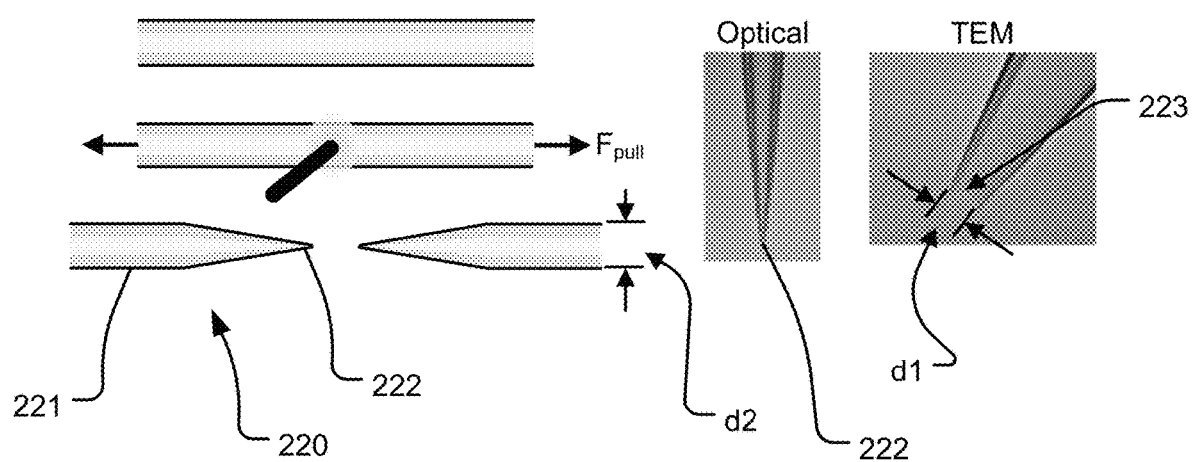
FIG. 3 is an illustration of a method for forming a probe in accordance with various embodiments described herein, the probe being suitable for use in the methods and systems described herein.

With reference now to FIG. 3, further details on probe 220 are provided. Probe 220 may generally have a needle-like configuration with a hollow passage 221 extending through the probe 220 and terminating at a distal tip 222 having an opening 223. The opening 223 has a diameter d1 that is generally smaller than the diameter d2 at the main body portion of the probe 220 such that the probe 220 generally tapers towards the tip 222 at the distal end of the probe 220. While not shown in FIG. 3, the tip of probe 220 may alternatively be beveled.

As discussed in greater detail with respect to FIG. 2, the vacuum pump system 230 is in fluid communication with the probe 220 such that air is drawn into the probe via opening 223 in tip 222 and up through the body portion of the probe 220, thereby creating a suction force at the tip 222. When the tip 222 of probe 220 is positioned sufficiently close to a target particle, the target particle will be drawn up to the tip 222 of probe 220 and held against the tip 222 so long as the vacuum pump system 230 continues to pull air up, into, and through the probe 220. Generally speaking, the diameter d1 of opening 223 should be less than or equal to the size of the smallest particle to be collected by the probe in order to ensure that the particle cannot enter into the probe 220 through the opening 223. In some embodiments, d1 is in the range of from 0.01 to 1,000 micrometers, such as from 0.1 to 10 μm. In some embodiments, d1 does not exceed 1 μm.

The material of the probe 220 is generally not limited provided a needle-like probe with the desired dimensions can be made from the selected material. That being said, in some embodiments where contamination of the particle is to be avoided, the material of the probe may be selected from a material that will not contaminate the particle upon contact therewith. In some embodiments, this generally requires metal-free materials. In some embodiments, glass-type materials are preferred for non-contaminating applications. In some embodiments, quartz is a preferred material for the probe due to its non-contaminating characteristics. Other materials that may be used for the probe include, but are not limited to, borosilicate glass, aluminosilicate glass, or plastic.

FIG. 3 also provides an illustration of a manner for forming probe 220. In some embodiments, probes 220 are formed using laser assisted pipet pulling. As shown via the arrows in FIG. 3, this generally includes pulling a tube of the probe material in opposite directions after and/or while heating a middle section of the tube. The opposing pulling forces will ultimately result in sections of the probe material separating, forming tapered tips on each section at the point of separation. Probes formed in this manner can be characterized via optical microscopy, transmission electron microscopy (TEM), and/or electrochemically, depending on the expected size of the probe in question, in order to determine final dimensions (such as the diameter of the tip opening) of the formed probes. Parameters employed in the fabrication process (e.g., initial capillary dimensions, laser power, illumination pattern, heating time, pulling strength, time delay, etc.) can be systematically varied to develop suitable conditions for fabricating probes having the desired tip opening dimensions (e.g., between 100 nm and 10 μm) and/or probe geometry.

As stated previously, a general design requirement is that the tip opening of the probe have a smaller diameter than the target particle. In some embodiments, a correlation between tip opening size and target particles that can be collected using a specific tip opening size must be considered. For example, a tip opening of a relatively small size (e.g., 100 nm) may not be able to collect some larger particles (e.g., 100 μm) due to insufficient suction force through the small diameter tip. In some embodiments, the tip opening size should not be less than one tenth the size of the particle to be collected.

In view of the limitations that may exist with respect to collecting certain size particles with probes having relatively small tip openings, an alternate embodiment to the system 200 shown in FIG. 2 may include multiple probes 220, with the multiple probes including different tip opening diameters. Such a configuration may allow the system to collect a wider range of particles from a sample. The system 200 may also be configured to automatically take into account the size of the particle to be collected (which may be determined during, e.g., image analysis) and use the appropriate probe for collection. For example, the system may include a first probe having a tip opening diameter of 0.01 μm and a second probe having a tip opening diameter of 1 μm. When the particle to be collected has a size of 5 μm, the system 200 (via processor 240) knows to instruct the second probe to collect the target particle since the first probe is unlikely to be able to create enough suction force to collect a particle of this size. Correspondingly, when the particle to be collected has a size of 0.1 μm, the system 200 (via processor 240) knows to send the first probe to collect this sized particle, so as to avoid the second probe pulling the 0.1 μm particle through the 1 μm tip opening and into the body of the second probe. The second probe having a larger diameter opening may also be suitable for use in collecting a cluster of particles in scenarios where the cluster of particles are sufficiently adhered to one another such that a suction force applied by the second probe to the cluster for the purpose of collection does not result in one or more particles being separated from the targeted cluster.

While not shown in FIG. 3, alternate embodiments of the probe 220 may include additional structures and/or materials at the tip of the probe in order to create better contact between the probe tip and the target particle. Such additions may be especially useful for target particles with irregular geometries. In some embodiments, the probe tip may include a flexible mask or membrane capable of conforming to the shape of the particle to create a better suction seal between the tip and the particle. When such tip additions are used, care needs to be taken to ensure that the material of the tip additions is sufficiently flexible so as to not damage the particle when the addition comes into contact with the target particle. Care should also be taken to ensure the material of the addition is non-contaminating.

Issues of particles "sticking" to the tips of probe 220 may also arise. In such instances, termination of vacuum suction may not result in the particle releasing from the probe 200. Particle "sticking" may arise from, e.g., electrostatic effects. Accordingly, in some embodiments, the probes 220 are further modified or treated to combat particle "sticking". In some embodiments, chemical modification of probes 220 is carried out, such as chemical modification of the probe 220 through treatment with alkoxysilanes with differing functionalities to alter the hydrophobicity and/or polarity of the surface of the probe 220. In other embodiments, probe modification to combat particle "sticking" includes coating the surface of the probe with metal to thereby enable the dissipation of any electrostatic charges. In some embodiments, silver films produced via the Tollens method can be employed.

While the embodiments described previously generally rely on terminating a suction force created from application of a vacuum up through the probe in order to release a particle from the probe, it should be appreciated that other methods of releasing the particle can be used, either in conjunction with terminating suction force or in place of terminating suction force. For example, physical movement of the probe (e.g., varying the z position, up and down, in relatively quick succession) can be used to release the particle. Additionally, adhesive/attractive substrates can be used, wherein the force of adhesion attraction between the particle and the adhesive/attractive substrate can overcome the suction force and/or the adhesion/attractive force between the particle the probe tip. In still another example, static force can be used to separate the particle from the probe tip. And in still another example, the vacuum up through the probe can be terminated, followed by blowing air down through the probe (i.e., towards the probe tip) to push the particle off the probe tip.

As noted previously, the particles that can be identified, collected, and relocated by the systems and method described herein are generally not limited provided that the particles can be imaged and are of the appropriate size for the specific system and methods being used. In some embodiments, the systems and methods described herein are especially well suited for manipulating (e.g., collecting and relocating) particles having a particle size in the range of 0.01 to 1,000 micrometers. The material of the particles is also generally not limited, though in some embodiments, the systems and methods described herein are especially well suited for manipulating particles made from refractory materials. Non-limiting materials include $SiO_2$, $Al_2O_3$, and SiC. The systems and methods described herein can also be applied to other materials such as metal oxides, metals, or microplastics. The general shape of the particles is also not limited. The particles may have regular shapes, such as spheres or cubes, or may have irregular shapes. While the shape of the particle may have some impact on the ability of the probe to collect the target particle, it is envisioned that the systems and methods described herein are capable of collecting any shaped particle via the use of an appropriate amount of suction force through a probe with an appropriately sized tip opening diameter and/or tip attachment.

As discussed previously, the particles to be manipulated by the systems and methods described herein are generally disposed on a substrate to thereby form the mixed sample of particles. The material of the substrate used for supporting the particles is generally not limited. Similarly, the material of the tray or substrate on to which particles are disposed after having been identified and removed from the mixed sample of particles is also not limited.

Finite element simulations have been carried out to estimate the flow through the probes required to collect particles with spherical and cubic geometries. Flows through these probes are estimated to be on the order of 10-100 μL/min, making contact detection via airflow monitoring (discussed in greater detail herein) a feasible strategy. Additionally, based on the similarity in the flow rates determined to be successful in collecting spherical and cubic particles, it is predicted that particle geometry will not have a significant impact on ability of the methods and systems described herein to successfully collect particles of different shapes.

Figure 4:
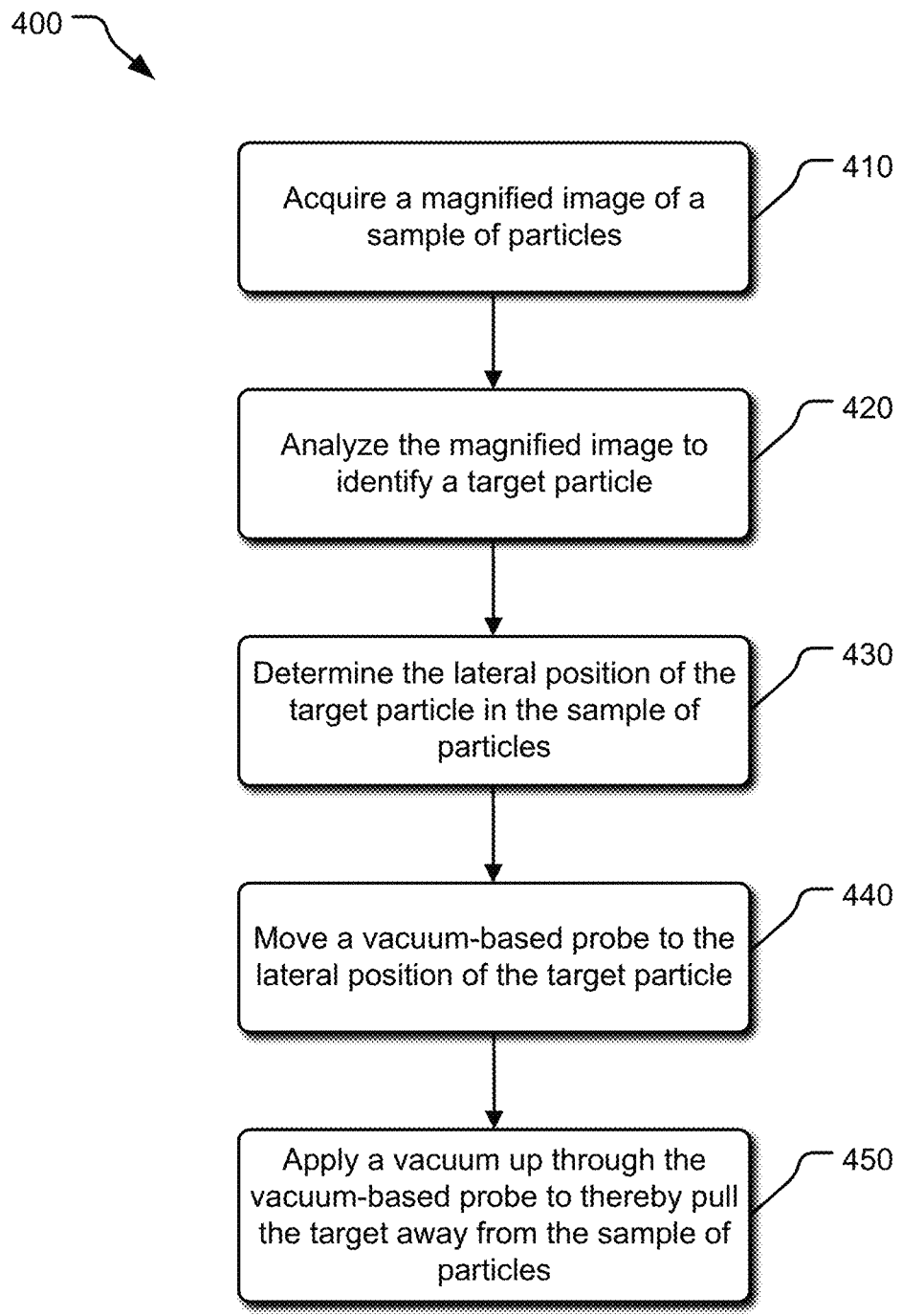
FIG. 4 is a flow chart illustrating a method for identifying, collecting and relocating particles in accordance with various embodiments described herein.

With reference to FIG. 4, a flow chart showing a method 400 of operating the system described in FIG. 2 such that a target particle is identified, located, collected, and repositioned, is provided. The method 400 shown in FIG. 4 generally includes a step 410 of acquiring a magnified image of a sample of particles, a step 420 of analyzing the magnified image to identify a target particle, a step 430 of determining the lateral position of the target particle in the sample of particles, a step 440 of moving a vacuum-based probe to the lateral position of the target particle, and a step 450 of applying a vacuum up through the vacuum-based probe to thereby pull the target away from the sample of particles and hold the target particle against a tip of the probe. While not shown in FIG. 4, the method 400 may further comprise a step of moving the vacuum-based probe to a new location after the target particle has been pulled up from the sample and held against the probe tip, and a step of depositing the target particle in a new location by terminating the vacuum to thereby let the target particle fall away from the tip of the probe.

With respect to step 410, a magnified image of the sample of particles is acquired. As discussed in greater detail above, the magnified image can be acquired by, e.g., an optical microscope and using dark field imaging. Once the image is acquired, the image can be sent to a processor for the image analysis of step 420. In some embodiments, the sample of particles of which a magnified image is acquired includes a plurality of particles that may have different sizes, shapes and/or material types. In some embodiments, the size of the particles in the sample are in the range of from 0.01 to 1,000 micrometers.

With respect to step 420, analysis of the magnified image is carried out to identify one or more target particles in the image. Such analysis is typically carried out by a processor that is configured to receive the image acquired in step 410. The processor may be equipped to run any suitable type of analysis using any suitable software platform provided that the performed analysis is capable of measuring one or more criteria of the particles in the sample and using the measured criteria to identify target particles. Identifying target particles may generally involve identifying those particles that meet one or more selection criteria. Any selection criteria or combination of selection criteria can be used, and the processor can be programmed to use different types of selection criteria to make the overall system more adaptable to different types of samples. In one basic example, the selection criteria is particle size. In this example, the image is analyzed in step 420 to determine the size of all particles in the sample of particles. The processor than applies a size selection criteria (e.g., target particles are only those with a size in the range of from 100 to 500 micrometers) and particles meeting this selection criteria are deemed target particles.

In step 430, the processor determines or records the precise location within the sample where each target particle is located. Generally speaking, the lateral location (i.e., the x and y coordinates within the sample) of each particle are determined and recorded. Due to the nano- and micrometer scale involved, the lateral coordinates are determined to a very precise degree to help ensure that the probe is able to collect the specific target particle in question. If the x and y coordinates are not determined to a precise enough degree, this risks the probe being unable to collect the target particle (such as if the probe is positioned over an empty space near the target particle) or the probe collecting the wrong particle (such as is if the probe is positioned over an adjacent particle to the target particle).

In step 440, the vacuum-based probe is moved to the lateral position of a first target particle identified during the analysis step 420. The probe can be moved precisely so as to match the precise location of the first target particle determined in step 430. While any suitable means of moving the probe can be used, in some embodiments a three-axis piezo system is used. The three-axis piezo system is able to move the probe to a precise location in the x and y directions, and is also capable of moving the probe in a z direction as discussed in more detail herein.

In step 450, a vacuum is applied up through the vacuum-based probe to thereby pull the target particle away from the sample of particles and hold the target particle against a tip of the probe. As discussed previously, the vacuum can be applied up through the probe by initiating a vacuum pump and opening a solenoid valve that allows the vacuum pump to draw air from outside the tip of the probe into and through the probe, and back towards the pump. The vacuum pump is in fluid communication with the hollow tube extending through the probe in order to allow for this direction of air flow. The applied vacuum can be started and stopped by terminating the vacuum pump and/or closing and opening the solenoid valve. As discussed previously, sufficient air flow is pulled up into the probe so as to provide a suction force at the tip of the probe, the suction force being sufficient to pull a target particle away from the sample and hold the sample against the tip of the probe. In some embodiments, the suction force used must be enough to overcome both gravity and any attractive forces between the target particle and the surface of the sample.

In some embodiments, step 450 further includes vertical movement (i.e., in the z direction) of the probe down towards the target particle as part of collecting the target particle. The vertical distance the tip is away from the target particle may be such that the suction force alone cannot pull the target particle away from the sample and up to the tip of the probe. Thus, in order to provide sufficient suction force, the probe is moved vertically down towards the target particle until the distance has been reduced to the point of allowing the suction force being applied at the tip of the probe to pull the target particle up from the sample and to the tip of the probe. During the vertical approach of the probe towards the particle, airflow through the probe can be continuously monitored, such as via the flow meter previously discussed and shown in FIG. 2. Detection of the particle being pulled up to the tip of the probe is determined when a sudden drop in flow is detected by the flow meter, indicating the particle is blocking the tip opening of the probe. The processor is configured to monitor and detect this drop in flow, at which point the processor instructs the probe to cease vertical movement towards the particle. This helps to ensure that the probe does not contact (and potentially damage) the particle.

In some embodiments, the vacuum suction provided by the probe may not be sufficient to pull the target particle up and away from the sample. Vacuum suction may not be sufficient in instances where competing forces (e.g., gravity, attractive forces between the particle and the substrate, etc.) are greater than the upward force supplied by the vacuum suction. In some embodiments, steps may be taken to assist with pulling the target particle up and away from the sample. In one example, an inert liquid medium may be provided to the particles on the sample such that the particles are at least partially immersed in the inert liquid medium. The introduction of the inert liquid medium introduces an upward force due to buoyancy that may, in combination with the suction force, may be able to overcome any competing downward forces.

In another embodiments, release of particles from the substrate may be aided by upward blowing of air from below the particles. For example, the substrate on which the particles are deposited may include a series of perforations through which air can be blown from an air supply positioned under the substrate. In some embodiments, the location of where air is blown up through the substrate may be selective. For example, the system (e.g., via the processor) may use previously determined information regarding the location of the target particle (and which is used to position the probe) to turn on upward blowing air only in the location of the target particle. Similarly, the system may be designed such that air is blown upward through the substrate only when it is determined that the suction force provided by the probe is not sufficient to pull the target particle up and away from the substrate. For example, and as previously discussed, air flow through the probe may be monitored during vertical movement of the probe toward the target particle. If the probe tip is moved to within a predetermined distance of the target particle without recording a drop in air flow through the probe indicative of the target particle being pulled up against the tip of the probe, the system (via the processor) may instruct the air blowing system under the substrate to initiate in order to provide the supplemental upward force via air blowing up through the substrate in at least the vicinity of the target particle.

Once the particle is collected by the probe and held against the probe tip by continual vacuum force, the probe can be retracted (if it has moved in a vertical direction towards the particle) and moved laterally to a predesignated retrieval location. As with determining the precise lateral location of the target particle, the predesignated retrieval location can also be assigned a highly specific location that the probe is capable of moving to. Once appropriately in position, the vacuum is then terminated by sending an appropriate signal to the solenoid valve or by turning of the vacuum pump, resulting in the release of the particle from the probe on to the predesignated retrieval location.

Figure 5A:
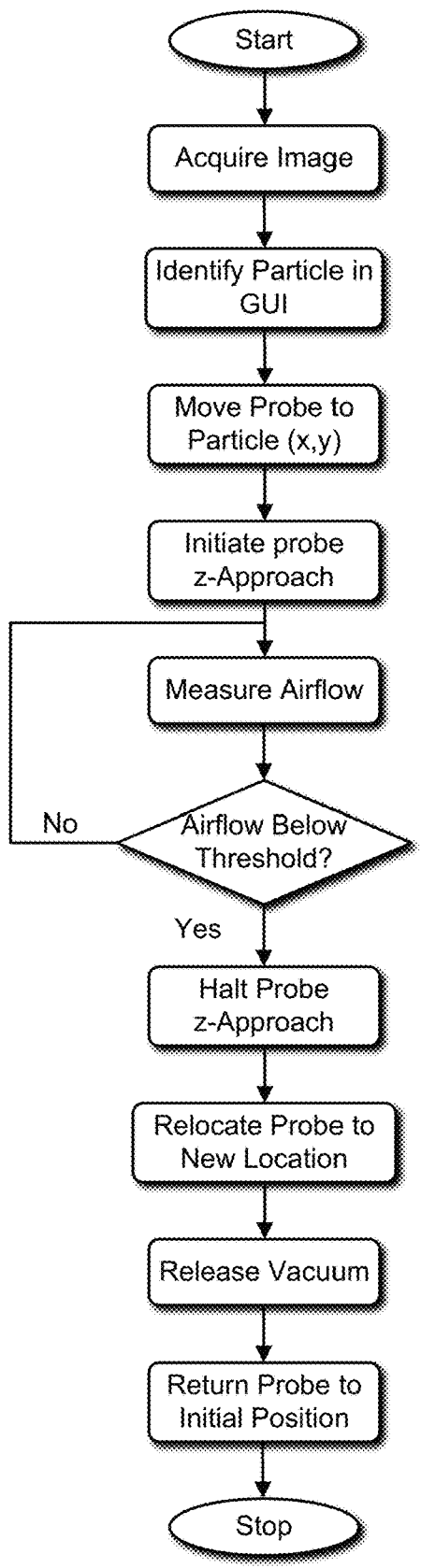
FIG. 5A is a flow chart illustrating a method for identifying, collecting and relocating particles in accordance with various embodiments described herein.
Figure 5B:
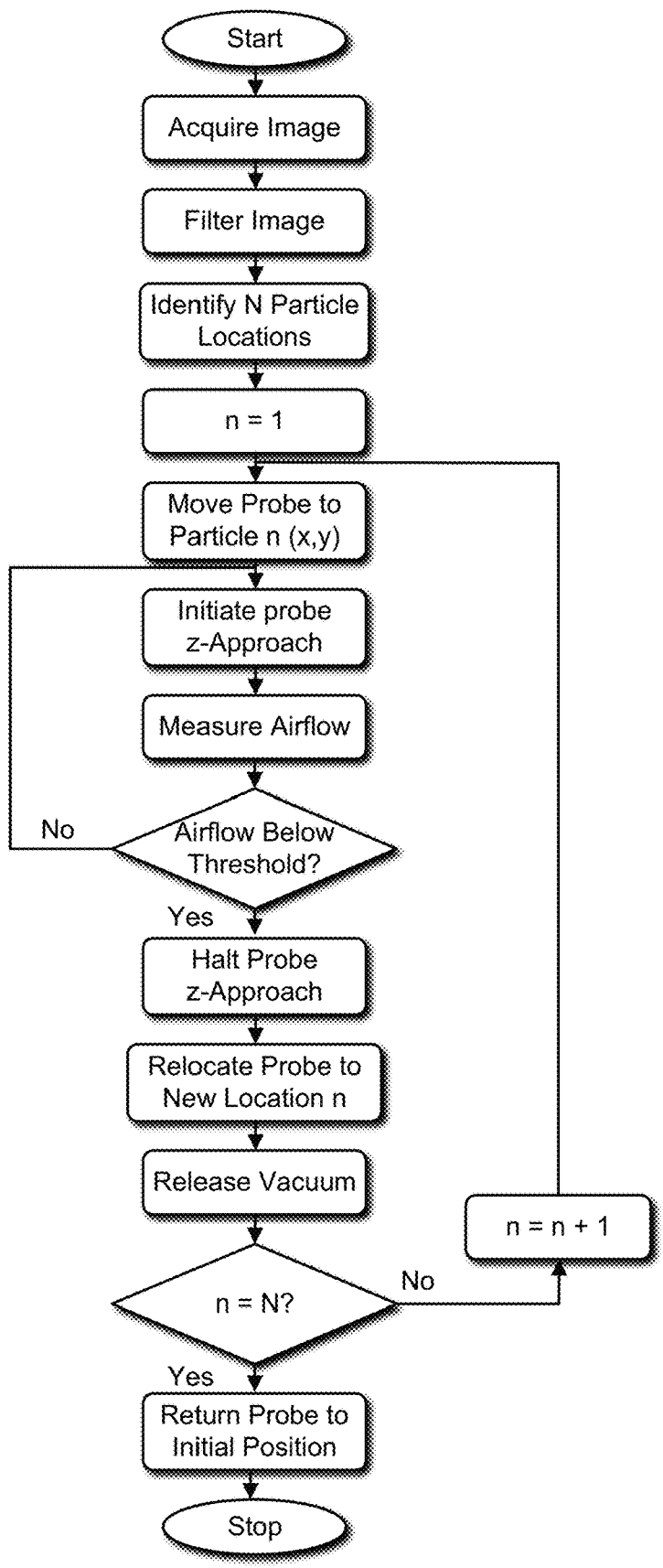
FIG. 5B is a flow chart illustrating a method for identifying, collecting and relocating particles in accordance with various embodiments described herein.

The above-described method can be partially or fully automated such that the system performs the desired particle manipulation with minimal or no human intervention. FIGS. 5A and 5B provide two flow charts illustrating semi-automated and fully automated methods that may be carried out by the processor that is communicatively coupled to the other components of the system.

With reference first to FIG. 5A, a semi-automated method for particle manipulation is shown. The method of FIG. 5A requires some human input as described in greater detail below. This method may also be considered interactive due to the input provided by a human user as part of carrying out the method. Briefly, the software that is executed by the processor follow the following procedure:

1. A "capture image" button is pressed in a GUI associated with the system. As a result, a dark field scattering image is acquired by the CCD camera, storing the data as a 16-bit array.

2. The image acquired in 1. is plotted in the GUI.

3. A particle of interest in the image is identified by the user via visual inspection of the image on the GUI. An input into the system noting the selected particle of interest is entered (such as by a mouse click when a cursor is positioned over the particle of interest or via the use of a touch screen). This input records the location of the particle.

4. A "retrieve particle" button is then pressed in the GUI, which initiates the particle manipulation procedure outlined in, e.g., FIG. 1 and FIG. 4. As part of this procedure, the probe is moved to the correct lateral (x,y) position; the vacuum is applied to the probe by sending an appropriate signal to the solenoid valve (opening a passage between the vacuum pump and the probe; the approach of the probe towards the substrate (movement in the z-direction) is initiated; during the probe approach, the flow rate through the probe is continuously monitored; upon detection of a significant change in the flow rate, the probe movement in the z-direction is stopped, as the drop in flow rate designates particle capture in the probe orifice; the probe (having the particle held thereto) is retracted (moved upward away from the substrate in the z-direction); the probe is moved to a predesignated new location; vacuum to the probe is then release by sending an appropriate signal to the solenoid (closing the passageway between the pump and the probe); and the probe is returned to its initial position.

With reference now to FIG. 5B, a fully automated method that does not require user input is outlined. While the method of FIG. 5B mirrors in many respect the method shown in FIG. 5A, the method of FIG. 5B differs primarily in the initial steps wherein rather than requiring user input to identify the particles of interest, particles of interest are identified automatically. As shown in FIG. 5B, acquired images are analyzed to automatically generate a list of particles for relocation through the following process:

1. An acquired image, stored as a 16-bit array, will be filtered with a Gaussian kernel of appropriate size in order to minimize features which fall outside of the size range of interest.

2. A threshold will be applied to generate a binary image which denotes which pixels are associated with a particle of interest.

3. For each contiguous active region in the binary image, a center of mass will be calculated which will serve as a particle location.

The method is then capable of proceeding generally in the same fashion as described above in FIG. 5A following the user manually identifying the particle of interest.

The systems and methods described herein are highly customizable and directly applicable to many commercial industries and advanced sectors, including microanalytical fields such as nuclear forensics (identified by the U.S. Department of Energy), advanced technology manufacturers, such as semiconductors, electronics, smart materials, and sensor technologies, and academic laboratories. Microanalytical industries will benefit by the improved resolution of the systems and method described herein and the ability to manipulate specific particles in a non-destructive, non-contaminating manner. The disclosed systems and methods can also improve a variety of micro- and nanotechnologies by providing a platform which can non-destructively rearrange particulate materials in desired patterns without contamination. In one specific beneficial application, the systems and methods described herein can be used to precisely remove contaminant particles.

From the foregoing, it will be appreciated that specific embodiments of the invention have been described herein for purposes of illustration, but that various modifications may be made without deviating from the scope of the invention. Accordingly, the invention is not limited except as by the appended claims.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended.

Unless otherwise indicated, all numbers or expressions, such as those expressing dimensions, physical characteristics, etc., used in the specification (other than the claims) are understood as modified in all instances by the term "approximately". At the very least, and not as an attempt to limit the application of the doctrine of equivalents to the claims, each numerical parameter recited in the specification or claims which is modified by the term "approximately" should at least be construed in light of the number of recited significant digits and by applying rounding techniques. Moreover, all ranges disclosed herein are to be understood to encompass and provide support for claims that recite any and all sub-ranges or any and all individual values subsumed therein. For example, a stated range of 1 to 10 should be considered to include and provide support for claims that recite any and all sub-ranges or individual values that are between and/or inclusive of the minimum value of 1 and the maximum value of 10; that is, all sub-ranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

We claim:

1. A particle manipulation system, comprising:
an optical imaging system configured to acquire an image of a sample of particles;
a processor configured to analyze the image, the image analysis comprising at least identifying a target particle in the image and determining or recording the lateral position of the target particle in the sample of particles; and
a vacuum-based probe system comprising:
a moveable probe comprising a hollow needle having an opening at a distal end thereof, the opening having a first diameter that is smaller than the size of the target particle; and
a vacuum pump configured to apply a vacuum up through the probe;
wherein the processor is further configured to instruct the vacuum-based probe system to:
move the moveable probe to the lateral position of the target particle; and
apply a vacuum up through the probe such that the target particle is pulled away from the sample of particles and held against the tip of the moveable probe.

2. The particle manipulation system of claim 1, wherein the first diameter of the opening is in the range of from 0.01 to 1000 micrometers.

3. The particle manipulation system of claim 1, wherein:
the vacuum-based probe system further comprises a flow meter configured to monitor air flow through the moveable probe;
the moveable probe is configured to move vertically; and
the processor is further configured to instruct the vacuum-based probe system to:
after the moveable probe has been moved to the lateral position of the target particle and the vacuum has been applied, move the moveable probe in a vertical direction towards the target particle;
monitor the airflow through the moveable probe via the flow meter while the probe moves in a vertical direction towards the target particle; and terminate vertical movement of the moveable probe when a drop in airflow through the moveable probe is measured by the flow meter.

4. The particle manipulation system of claim 1, further comprising:
a particle retrieval tray configured for receiving the target particle from the moveable probe.

5. The particle manipulation system of claim 4, wherein the processor is further configured to instruct the vacuum-based probe system to:
move the moveable probe having the target particle held against the tip thereof to a lateral position over the particle retrieval tray; and
terminate the vacuum such that the target particle releases from the tip of the moveable probe on to the particle retrieval tray.

6. The particle manipulation system of claim 1, wherein the optical imaging system comprises:
an optical microscope configured to acquire an image of the sample of particles;
a light source configured to illuminate the sample of particles; and
a camera configured to receive and record the image.

7. The particle manipulation system of claim 6, wherein the optical imaging system is configured to perform dark field optical microscopy.

8. configured to acquire a high-resolution image of a sample of particles comprising a plurality of particles having a size in the range of from 0.01 to 1,000 micrometers.

9. A method of manipulating nano-and micrometer scale particles, comprising:
acquiring a magnified image of a sample of particles, the sample of particles comprising a plurality of particles having a size in the range of from 0.01 to 1,000 micrometers;
analyzing the magnified image to identify a target particle;
determining the lateral position of the target particle in the sample of particles;
moving a vacuum-based probe to the lateral position of the target particle; and
applying a vacuum up through the vacuum-based probe to thereby pull the target particle away from the sample of particles and hold the target particle against a tip of the probe;
wherein the vacuum-based probe comprises a hollow needle having an opening at a distal end thereof, the opening having a first diameter that is smaller than the size of the target particle.

10. The method of claim 9, further comprising:
moving the vacuum-based probe having the target particle held against the tip thereof to a lateral position over a particle retrieval tray; and
terminating the vacuum such that the target particle releases from the tip of the vacuum-based probe on to the particle retrieval tray.

11. The method of claim 9, further comprising:
after moving the vacuum-based probe to the lateral position of the target particle and applying a vacuum up through the vacuum-based probe, moving the vacuum-based probe in a vertical direction towards the target particle;
monitoring air flow through the vacuum-based probe while the probe moves in a vertical direction towards the target particle; and
when a drop in airflow is measured, terminating vertical movement of the vacuum-based probe.

12. The method of claim 9, wherein acquiring the magnified image of the sample of particles comprises using dark field imaging.

13. The method of claim 12, wherein the plurality of particles are refractory particles.

14. The method of claim 13, wherein dark field imaging comprises directing a light source at the sample of particles at a predetermined angle of incidence.

15. The method of claim 9, wherein the first diameter of the opening is in the range of from 0.01 to 1,000 micrometers.

16. The method of claim 9, further comprising:
displaying the magnified image of the sample of particles on a display; and
wherein analyzing the magnified image to identify a target particle comprises receiving a user input selecting a particle displayed on the display to thereby identify the particle as the target particle.

17. The method of claim 9, wherein analyzing the magnified image to identify a target particle comprises using machine vision algorithms to analyze the magnified image and identify the target particle.

* * * * *